United States Patent Office 3,439,701
Patented Apr. 22, 1969

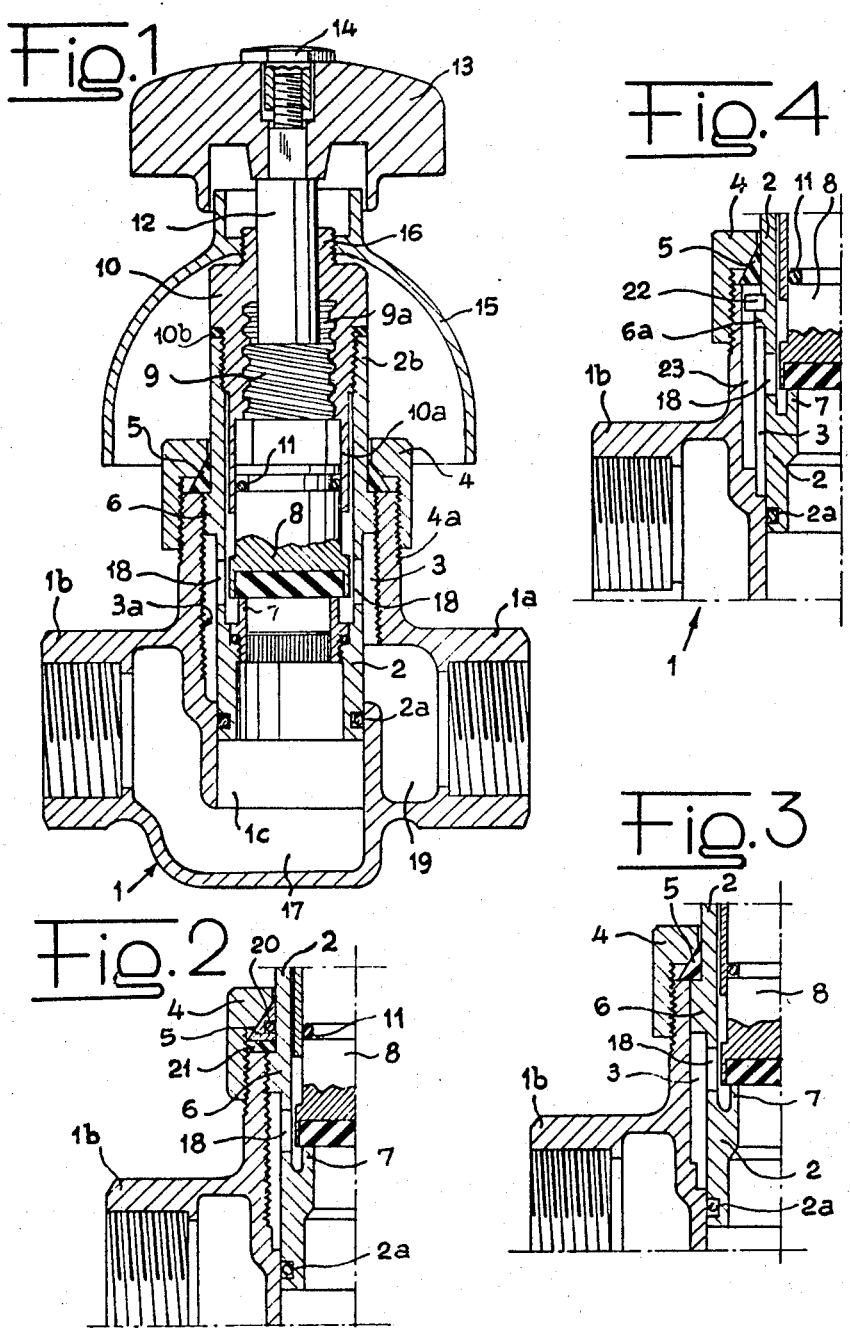

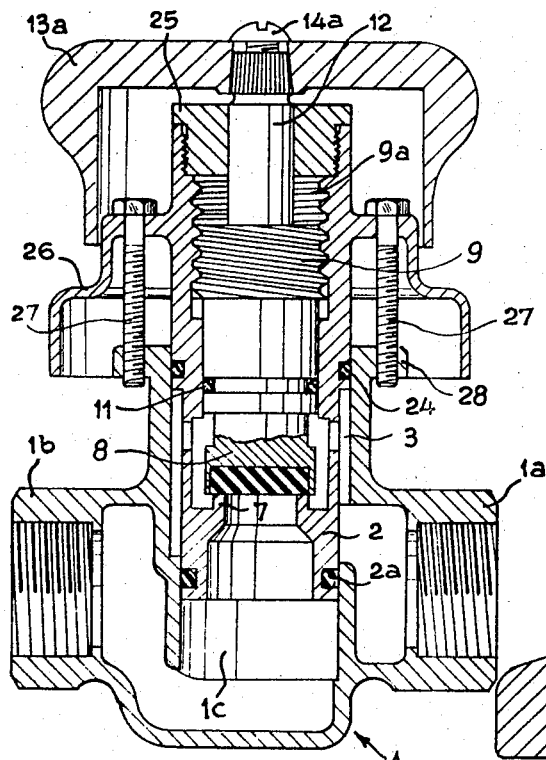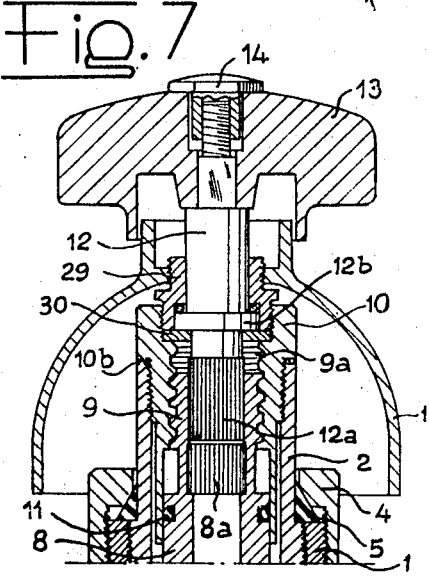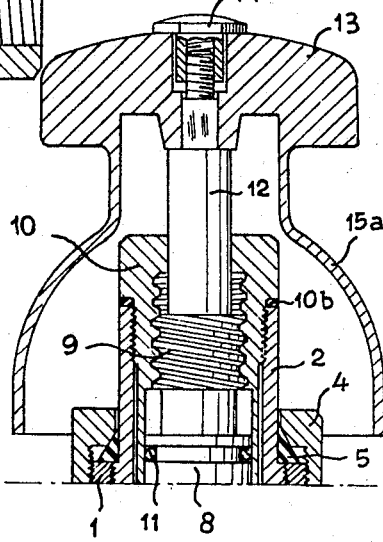

1

3,439,701
TAP OF THE BUILT-IN TYPE
Pietro Stella, 17 Via dei Cattaneo, Novara, Italy
Filed Apr. 12, 1966, Ser. No. 542,155
Claims priority, application Italy, May 31, 1965,
12,467/65
Int. Cl. F16k 1/32, 27/02, 27/12
U.S. Cl. 137—359                    2 Claims

ABSTRACT OF THE DISCLOSURE

A fluid control device such as a tap, cock, valve or the like, of the type intended to be built into a wall or similar support, in which the flow control means, sealing members, spindle, control handle, and the covering hood are supported by a bushing tightly slidable in a bore in the tap body, and having means for adjustably setting the position of said bushing with respect to said body.

---

The invention relates to fluid control devices, such as taps, cocks, valves or the like, intended to control fluid flow through a pipe built into a wall or similar support. Such a device is usually also built into the support with only its control handle protruding from the surface of the support.

Such arrangements, which are widely used in sanitary apparatus, baths, showers and the like, are difficult to install neatly and with consistent protrusion owing to the impossibility of previously accurately determining the depth to which the pipes have been buried in the support and of what type the finished surface of the support will be, e.g., to what depth it will be plastered.

Even when the pipe depth and surface thickness is known, the depth to which the device should be sunk into the support cannot be accurately determined on account of the inherent difficulties in building the masonry to a constant thickness within the order of millimeters.

In attempts at least substantially overcoming the above-mentioned difficulties control devices of the built-in type have been arranged to permit building-in at depths readily variable within predetermined limits.

For instance this has been achieved by providing a tap device covering hood for positioning between the tap handle and the wall, such a hood being slidable on assembly to allow it to move into a position flush with the finished wall surface, and to vary its spacing from the buried pipes to make up for any difference in building-in depths.

However, this axial displacement of the hood materially affects the appearance and symmetry of the exposed tap portion, as it may alter the designed ratio of proportions of the device as a whole. The snag in such an arrangement is that the handle is fixedly mounted at a given distance from and with respect to the pipes.

The present invention has for an object to at least substantially obviate the above disadvantages by providing a fluid flow control device such as a tap of the built-in type referred to above, but additionally adapted to be installed at variable depths while leaving the spacing between the hood and handle substantially unaltered.

A further and more specific object is to provide a fluid control device in which all the closing and sealing members, the tap driving spindles and the handle and covering hood and supported by a bushing which is axially displaceable in a bore provided in the device, means being provided for fixing the axial and angular position of the bushing with respect to the device body.

These and other objects and advantages of the invention will become clear from the following description, given with reference to the accompanying drawings, which are by way of example and in which:

2

FIGURE 1 is a partly axial sectional view of a built-in tap device according to this invention;

FIGURES 2, 3 and 4 are axial sectional views showing detail modifications of a portion of the device of FIGURE 1, the modifications relating to the means for fixing a slidable bushing thereof;

FIGURE 5 is a partly axial sectional view showing a further modification of FIGURE 1, and FIGURES 6 and 7 are partly axial sectional views showing further detail modifications of a portion of the device of FIGURE 1.

In the following exemplary description the terms "upper" and "lower" are intended to mean "nearest to the support surface" and "deepest in the support," respectively.

Referring to FIGURE 1, the tap body 1 is provided with two stub pipes 1a, 1b arranged and adapted to be connected to the pipes through which the fluid flow is to be controlled. In the example shown the stub pipes are arranged along a common axis.

The tab body 1 is formed at right angles to the said axis and is provided with a hollow bore 3 open at its upper end and having at its bottom a calibrated region 1c in which a bushing 2 is tightly slidable. The bushing 2 is provided, at its portion engaging the calibrated region, with a seal 2a.

The bushing 2 is centrally provided with a valve seat 7 which can be either integral therewith or removably attached thereto, the latter being the case in the embodiment shown in FIGURE 1. The seat 7 is adapted to cooperate with a valve member 8 which is fast with a screw 9 engaged in a manner known per se by a nut 10. The nut 10 is secured, for instance by screwing, to an end extension 2b of the bushing 2, a seal 10b being interposed between the extension 2b and the nut 10.

The valve member 8 is provided with a further seat 11 situated between the said valve member and a cylindrical cavity 10a in the nut 10.

The valve member 8 and the screw 9 that is fast therewith are rotatable in a known manner by a rotary spindle 12 which has secured to it a handle 13. The latter is either prismatically coupled or splined to the spindle 12 and is axially retained thereon by a nut 14.

The nut 10 is formed at its upper end with a screw threaded nose 16 to which a covering hood 15 is screwed. The bushing 2 is formed with an upper projection 6 threaded to a screw into a matingly threaded region 3a in the walls of the tap bore 3 to facilitate axial positioning of the bushing 2 with respect to the tap body 1.

The axial and angular location of the bushing 2 with respect to the tap body 1 is maintained by a tapped locking collar 4 which is screwed on a screw threaded portion 4a of the tap body 1, a seal 5 in the shape of a conical ring of deformable material being interposed between the tapped collar 4 and the outer surface of the bushing 2.

It will by now be obvious that all the sealing and closing members of the tap, including the seat 7 and valve member 8, the driving spindle 12, the handle 13 and the covering hood 15 are supported by the bushing 2. The axial position of the bushing 2 can of course be varied with respect to the tap body 1 and this allows compensation for any of the differences in building-in depths which have previously created the problems already referred to. The hood 15 may thus be positioned at will with respect to the finished wall or other support surface without any necessity to alter the spacing between the handle 13 and hood 15.

The bushing 2 is formed with lateral openings 18 which are adapted to connect, in the open tap condition, the two tap bores 17, 19 and to interconnect the stub pipes 1b, 1a.

FIGURE 2 shows a modification of the tap of FIG. 1 in which the seal 5 interposed between the tapped collar 4 and the bushing 2 is in the form of a metal conical ring having a toroidal seal 20 which acts against the outer cylindrical wall of the bushing 2. Sealing is further enhanced by the provision of a flat ring seal 21 acting against the upper end edge of the bore 3.

Coupling of the bushing 2 and tap body can be effected, in addition to the screwing arrangement explained with reference to FIG. 1, by a cylindrical coupling. This is the modified feature peculiar to the embodiment shown in FIGURE 3. A projection 6 formed on the bushing 2 is slidably mounted in the bore 3 which is, in this case, smooth and un-threaded. The bushing 2 is retained in position by the seal 5 alone, the latter being deformed by tightening of the tapped collar 4.

In order to improve retention of the bushing 2 at a chosen angle with respect to the tap body, the said bushing may be provided with a tooth 22 in accordance with the modification shown in FIGURE 4. This tooth 22 slidingly engages an aixally longitudinal groove 23 cut in the tap body, the bushing 2 being again retained by tightening of the seal 5 by collar 4.

According to the still further embodiment shown in FIGURE 5, the bushing 2 is clamped to the tap body by a plurality of screws 27 which screw into a circular flange 28 fast with the said body 1. For this purpose the screws 27 pass freely through holes provided in the body of a hood 26 which in this case is integral with the bushing 2. In this embodiment the bushing 2 is provided with additonal seals 24.

According to this embodiment of FIGURE 5, the screw 9, fast with the valve member 8, is screwed into a tapped bore 9a provided in the body of the bushing 2. The bore 9a is closed at its upper end by a tapped plug 25 screwed into said bushing 2.

According to the further modification shown in FIGURE 6, a covering hood 15a is formed integrally with the handle 13 to simplify its assembly on the bushing 2.

According to a final modification shown in FIGURE 7, the driving spindle 12 is formed as a separate body with respect to the screw 9 fast with the valve member 8 (not shown in FIGURE 7) and is provided with a splined portion 12a which engages a splined recess 8a in the screw 9. In this case the spindle 12 is formed with an annular projection 12b which, on assembly, can be clamped between a screw threaded collar 29, screwable into a tapped bore of the nut 10, and an abutment washer 30 also screwable into the same bore. In this arrangement the screw threaded collar 29 supports the hood 15.

Other modifications of the invention within the spirit and scope thereof are of course possible.

What I claim is:

1. A fluid control device such as a tap, cock, valve or the like of the type intended to be built into a wall or similar support comprising:
   (a) a tap body having an axial bore and a pair of flow chambers;
   (b) a fluid flow control means including a valve member and a valve seat;
   (c) a control spindle for said flow control means;
   (d) a control handle mounted on said spindle;
   (e) a covering hood for at least partially concealing said flow control means and said spindle from view;
   (f) a bushing sealably mounted for sliding movement in said bore and carrying said flow control means, control spindle, control handle and covering hood;
   (g) a pair of interconnected, lateral openings in said bushing for interconnecting said flow chambers when said valve member is removed from said valve seat; and
   (h) adjusting means for setting the axial and angular position of said bushing with respect to said tap body, whereby adjustment of said bushing serves to control the distance that the control spindle, control handle and hood extend from said support.

2. A fluid control device as defined in claim 1 wherein said control spindle is formed separately from and connected to said valve member by a splined connection; wherein said control spindle includes an annular projection; and further including a collar and an abutment washer threadably mounted on said bushing for clamping engagement with said annular projection.

References Cited

UNITED STATES PATENTS

| | | | |
|---|---|---|---|
| 1,586,346 | 5/1926 | Wilson | 137—454.2 |
| 1,602,118 | 10/1926 | Mortimer | 137—454.5 |
| 1,605,457 | 11/1926 | Muend | 137—359 XR |
| 1,637,230 | 7/1927 | Mueller | 137—454.2 XR |
| 1,662,659 | 3/1928 | Birnstock | 137—454.6 |
| 1,677,794 | 7/1928 | Mueller et al. | 137—454.2 XR |
| 1,988,966 | 1/1935 | Eckhouse | 137—454.6 |
| 2,520,092 | 8/1950 | Frederickson et al. | 137—454.5 |
| 2,754,840 | 7/1956 | Hicks | 137—454.6 |
| 2,980,070 | 6/1961 | Fraser | 137—454.5 XR |
| 3,010,475 | 11/1961 | Kittler | 137—454.2 XR |
| 3,033,323 | 5/1962 | La Manna | 137—454.5 XR |
| 3,082,786 | 3/1963 | McLean | 137—454.5 |

HENRY T. KLINKSIEK, *Primary Examiner.*

U.S. Cl. X.R.

137—454.5, 454.6